United States Patent [19]

Nozaka et al.

[11] Patent Number: 5,229,861
[45] Date of Patent: Jul. 20, 1993

[54] ELECTRONIC GRAVURE ENGRAVING APPARATUS INCLUDING PHOTO TONE AND CHARACTER/SOLID TONE PROCESSING

[75] Inventors: Yoshiki Nozaka; Shinya Fujino; Tomoatsu Hirabe; Masayuki Uchida, all of Tokyo, Japan

[73] Assignee: Dai Nippon Insatsu Kabushiki Kaisha, Tokyo, Japan

[21] Appl. No.: 640,364
[22] PCT Filed: May 24, 1990
[86] PCT No.: PCT/JP90/00665
§ 371 Date: Jan. 17, 1991
§ 102(e) Date: Jan. 17, 1991
[87] PCT Pub. No.: WO90/14230
PCT Pub. Date: Nov. 29, 1990

[30] Foreign Application Priority Data

May 24, 1989 [JP] Japan .................. 1-132336
May 24, 1989 [JP] Japan .................. 1-132337
Mar. 27, 1990 [JP] Japan .................. 2-77398

[51] Int. Cl.⁵ .......................... H04N 1/23; B23C 1/18
[52] U.S. Cl. ............................ 358/299; 101/463.1; 409/79
[58] Field of Search ............ 358/299; 101/463.1; 409/79

[56] References Cited

U.S. PATENT DOCUMENTS 4,672,466 6/1987 Schimpf ................... 358/299

FOREIGN PATENT DOCUMENTS 2167024 6/1973 Fed. Rep. of Germany .
3601269 8/1986 Fed. Rep. of Germany .

OTHER PUBLICATIONS

DE-Z: Hell-Helio-Klischograph, pp. 14–17–English translation enclosed.
DE-Z: Der Polygraph 19-79, pp. 1585–1590–English translation enclosed.

*Primary Examiner*—Edward L. Coles, Sr.
*Assistant Examiner*—Scott A. Rogers
*Attorney, Agent, or Firm*—Parkhurst, Wendel & Rossi

[57] ABSTRACT

A manuscript picture is inputted at a picture input unit (10) as a set of pixels having a density value. On the plate, cells corresponding to inputted respective pixels are engraved by a stylus (32). The stylus is vibrated by a drive device (33) and is scanned on the plate by a scanning mechanism (31). Functions (A, B, C, D) for converting density values for respective pixels to cell width values indicating sizes of cells to be engraved are prepared. Thus, cell width values corresponding to density values provided at the picture input unit are generated. The stylus engraves cells corresponding to cell width values generated. The manuscript picture is dealt separately every a plurality of picture areas (A0, A1, A2). Conversions using different functions are applied to pixels within different picture areas. To the picture area of character/solid tone, new unique functions (B, D) are applied in order that a more distinct pictorial image is provided.

3 Claims, 6 Drawing Sheets

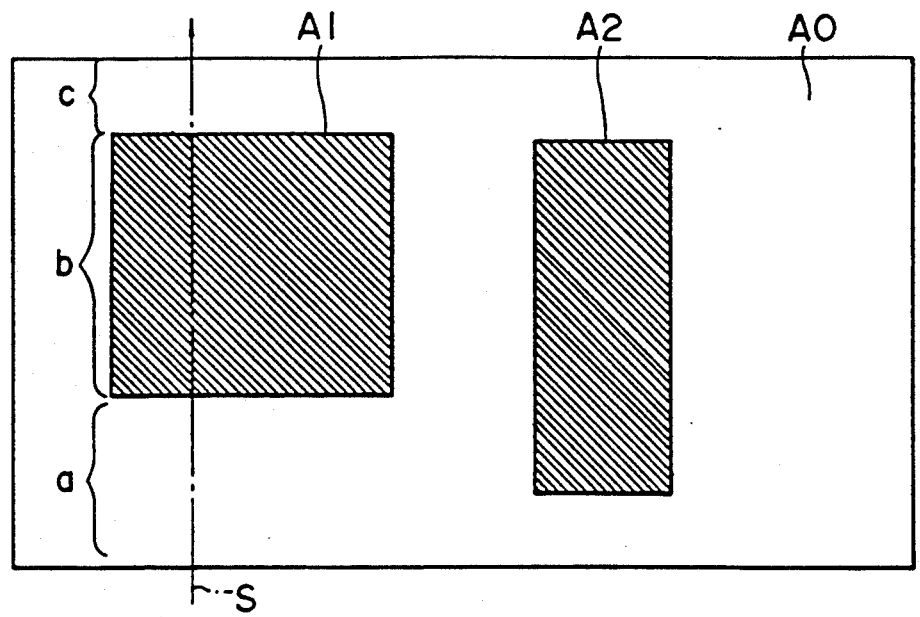
FIG.2
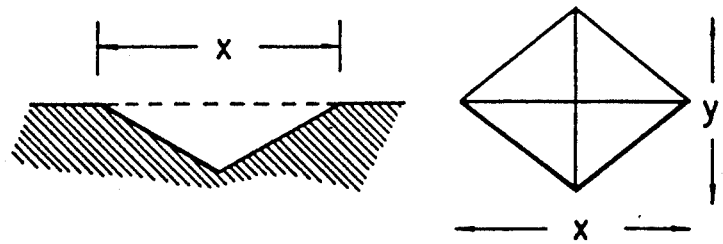
FIG.3a  FIG.3b
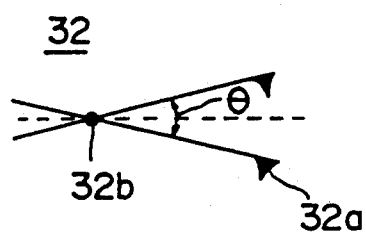
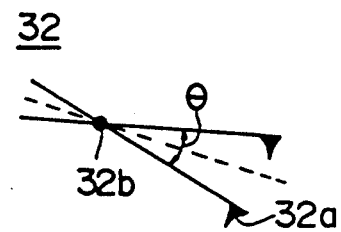
FIG.4a  FIG.4b

ELECTRONIC GRAVURE ENGRAVING APPARATUS INCLUDING PHOTO TONE AND CHARACTER/SOLID TONE PROCESSING

TECHNICAL FIELD

This invention relates to an electronic gravure engraving apparatus, and more particularly to an electronic gravure engraving apparatus in which a stylus is used to engrave cells corresponding to pixels to thereby make a press plate for gravure printing.

BACKGROUND ART

For making a plate for gravure printing, two kinds of methods are mainly known at present. One is a method called a corrosion system. This method is a method to implement chemical corrosion processing to a plate thus to form a press plate. The other is a method called an electronic engraving process system. This method is a method to engrave cells corresponding to pixels while scanning the stylus onto a plate thus to form a press plate. With the corrosion system, there are many uncertain elements because of necessity of the chemical processing. One the contrary, the electronic engraving process system has a merit that processing is easy because of physical processing. However, the electronic engraving process system has a problem that the picture quality is lower than that of the corrosion system. Particularly, a contour portion of a printing type becomes indistinct, so a sharp printing type cannot be provided. A printing type is difficult to read according as the size of the printing type becomes small.

DISCLOSURE OF INVENTION

With the above in view, an object of this invention is to provide an electronic gravure engraving apparatus capable of providing a satisfactory picture on a plate by the electronic engraving process system.

A first feature of this invention is directed to an apparatus for making a press plate for gravure printing by the electronic graving process comprising:

a picture input unit for inputting a manuscript picture as a set of pixels having a density value, an engraving unit including a stylus for engraving cells corresponding to the respective pixels on a plate, a drive device for vibrating the stylus, and a scanning mechanism for scanning the stylus onto the plate, and an engraving control unit generating cell width values corresponding to density values provided at the picture input unit by using functions for converting density values for pixels to cell width values indicating sizes of cells to be engraved, delivering these cell width values to the engraving unit to thereby engrave cells of desired sizes, wherein the engraving control unit recognizes a plurality of picture areas on the maniscript picture and permits application of conversions using different functions for different picture areas.

A second feature of this invention is directed to an apparatus for making a press plate for gravure printing by the electronic graving process comprising:

a picture input unit adapted to scan a manuscript picture prepared on separate photographic printing papers, each paper containing a predetermined picture area, the unit scanning each of the areas with a predetermined resolution to provide pictorial image data represented by a set of pixels having a density value, an engraving unit including a stylus for engraving cells corresponding to the respective pixels on a plate, a drive device for vibrating the stylus, and a scanning mechanism for scanning the stylus onto the plate, and an engraving control unit generating cell width values corresponding to density values provided at the picture input unit by using functions for converting density values for pixels to cell width values indicating sizes of cells to be engraved, delivering these cell width values to the engraving unit to thereby engrave cells of desired sizes, wherein the engraving control unit is caused to have an ability to apply conversions using different functions for different picture areas.

A third feature of this invention is directed to an apparatus for making a press plate for gravure printing by the electronic engraving process comprising:

pictorial image data generation unit to divide a manuscript picture into a plurality of picture areas to generate pictorial image data represented by a set of pixels having a density value, a pictorial image input unit for inputting respective pictorial image data generated at the pictorial image data generation unit, an engraving unit including a stylus for engraving cells corresponding to the respective pixels on a plate, a drive device for vibrating the stylus, and a scanning mechanism for scanning the stylus onto the plate, and an engraving control unit generating cell width values corresponding to density values provided at the pictorial image input unit by using a functions for converting density values for pixels to cell width values indicating sizes of cells to be engraved, delivering these cell width values to the engraving unit to thereby engrave cells of desired sizes, wherein the pictorial image input unit carries out, at a time of inputting pictorial image data, a conversion such that the pictorial image data has a resolution suitable for the engraving unit, and wherein the engraving control unit is caused to have an ability to apply conversions using different functions for different picture areas.

A fourth feature of this invention is directed to an apparatus for making a press plate for gravure printing by the electronic engraving process comprising:

a picture input unit for inputting a manuscript picture as a set of pixels having a density value, an engraving unit including a stylus for engraving cells corresponding to the respective pixels on a plate, a drive device for vibrating the stylus, and a scanning mechanism for scanning the stylus onto the plate, and an engraving control unit generating cell width values corresponding to density values provided at the picture input unit by using a function for converting density values for pixels to cell width values indicating sizes of cells to be engraved, delivering these cell width values to the engraving unit to thereby engrave cells of desired sizes, wherein a procedure is taken to set a first density value indicating a minimum density value necessary so that cells are engraved, a second density value indicating a minimum density value necessary so that cells of a maximum size are engraved, and a minimum cell width indicating a minimum size of cells engraved, and wherein a function is set so as to generate a cell width value indicating that any cell is not engraved at all when the density value is lower than the first density value, to generate a maximum cell width value indicating that cells of the maximum size are engraved when the density value is higher than the second density value, and to generate a cell width value increasing from the minimum cell width value to the maximum cell width value with an increase in the density value when the density value is between the first and second density values.

A fifth feature of this invention is characterized in that, in the apparatus according to the previously described fourth feature, a function such that the cell width value varies stepwise is further set for density values between the first and second density values.

A sixth feature of this invention is directed to an apparatus for making a press plate for the gravure printing by the electronic engraving process comprising:

a picture input unit for inputting a manuscript picture as a set of pixels having a density value, an engraving unit including a stylus for engraving cells corresponding to respective pixels on a plate, a drive device for vibrating the stylus, and a scanning mechanism for scanning the stylus onto the plate, and an engraving control unit generating cell width values corresponding to density values provided at the picture input unit by using a function for converting density values for pixels to cell width values indicating sizes of cell to be engraved, delivering these cell width values to the engraving unit to thereby engrave cells of desired sizes, wherein a procedure is taken to set a first density value indicating a minimum density value necessary so that cells are engraved, and to set a function so as to generate a cell width value indicating that any cell is not engraved at all when the density value is lower than the first density value, and to generate a cell width value increasing in a manner of logarithmic function with respect to an increase in the density value when the density value is higher than the first density value.

In the electronic gravure engraving apparatus according to the first to third features of the invention, there are prepared a plurality of functions used when converting density values to cell width values. The manuscript picture is divided into a plurality of picture areas. Thus, they can be handled as separate pictorial image data, respectively. An operator can designate pictures of different natures, e.g., a character and a photograph as separate picture areas on a manuscript picture. Different functions are applied to pictorial image data designated as separate picture areas in this way. Accordingly, proper use can be made in a manner that, e.g., a function such that the contour line becomes distinct is applied to a picture constituting a character and a function which gives a gentle tone is applied to a picture constituting a photograph. For this reason, a satisfactory pictorial image can be provided as a whole.

In the electronic gravure engraving apparatus according to the fourth feature of the invention, any cell is not engraved at all when the density value is lower than the first density value. Accordingly, only cells of a size larger than a certain value exist on the plate. Thus, the distinction of the contour portion of a printing type can be improved. Further, when the density value is higher than the second density value, cells of the maximum size are engraved. Accordingly, the cell area and the cell internal capacity are increased as a whole. Thus, a quantity of ink at the time of printing is increased, so printing having a high density can be carried out.

In the electronic gravure engraving apparatus according to the fifth feature of the invention, a function such that the cell width value varies stepwise is applied to density values between the first and second density values. Accordingly, the size of cells constituting the printing type is limited to several kinds of sizes. Thus, the distinction of the printing type can be improved.

In the electronic gravure engraving apparatus according to the sixth feature of the invention, when the density value is higher than the first density value, a cell width value increasing in a manner of a logarithmic function with respect to an increase in the density value is generated. Thus, the sizes of respective cells are enlarged as a whole, thus making it possible to prevent a blur in printing a book.

BRIEF DESCRIPTION OF THE DRAWINGS

FIG. 2 is a view showing a manuscript used in the apparatus shown in FIG. 1;

FIGS. 3a and 3b are a side cross sectional view and a top view showing one cell engraved by the apparatus shown in FIG. 1, respectively;

FIGS. 4a and 4b are views each showing a vibrating state of a stylus in the apparatus shown in FIG. 1.

BEST MODE FOR CARRYING OUT THE INVENTION

Basic Configuration of the Apparatus

Figure 1:
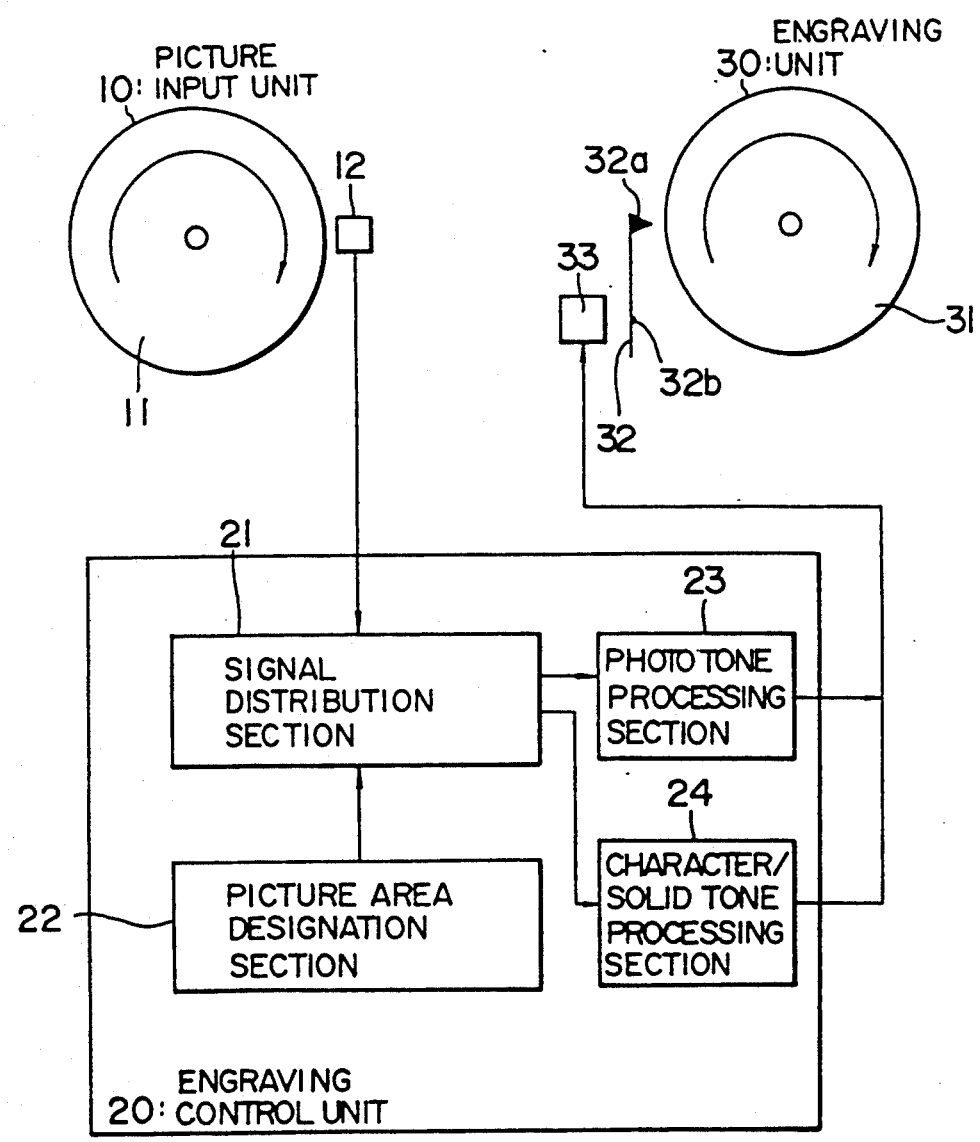
FIG. 1 is a block diagram showing the entirety of an electronic gravure engraving apparatus according to an embodiment of this invention.

The invention will now be described in accordance with the most preferred embodiments shown. FIG. 1 is a block diagram showing a basic embodiment of an electronic gravure engraving apparatus according to this invention. This apparatus is composed of three main units of a picture input unit 10, an engraving control unit 20, and an engraving unit 30. The picture input unit 10 constitutes an input scanner in an actual term, and includes a reading cylinder 11 and a reading head 12. The reading cylinder 11 rotates in a direction indicated by an arrow, and the reading head 12 slidably moves in a direction perpendicular to the plane of paper of the figure. Accordingly, by sticking a manuscript on the circumferential surface of the reading cylinder 11, it is possible to scan the reading head 12 with respect to the surface of the manuscript. Thus, the manuscript can be read from the reading head 12 as a set of pixel having a predetermined resolution. Namely, density values with respect to respective pixels constituting the manuscript can be provided.

An example of a manuscript surface is shown in FIG. 2. The horizontal direction in the figure is the direction of the rotary shaft of the reading cylinder 11, and the vertical direction in the figure is the circumferential direction of the reading cylinder 11. Here, single dotted lines S represent a locus with respect to the manuscript surface of the reading head 12 when the reading cylinder 11 makes one revolution. Every time the reading cylinder 11 makes one revolution in this way, the reading head 12 is moved by one pitch in a right direction in the figure. Thus, the entire surface of the manuscript is scanned.

Density values provided at the picture input unit 10 are delivered in sequence to the engraving control unit 20 on a time series basis. As described in detail later, the engraving control unit 20 is composed of a signal distribution section 21, a picture area designation section 22, a photo tone processing section 23, and a character/solid tone processing section 24, and has a function to convert density values delivered from the picture input unit 10 to cell width values indicating sizes of cells to be engraved. The converted cell width values are delivered to the engraving unit 30.

The engraving unit 30 comprises an engraving cylinder 31, a stylus 32 for engraving cells, and a drive device 33 for vibrating the stylus 32. At the front end of the stylus 32, a diamond needle 32a is provided. The entirety of the stylus 32 vibrates about the fulcrum 32b. Accordingly, a plate applied to the engraving cylinder 31 can be engraved by the front end of the diamond needle 32a. The engraving cylinder 31 rotates in a direction indicated by an arrow, and the stylus 32 slidably moves in a direction perpendicular to the plane of paper of the figure. Accordingly, scanning of the diamond needle 32a can be applied to the plane. Thus, cells can be engraved at positions corresponding to respective pixels constituting a manuscript. Scanning on the plane corresponds to the scanning on the manuscript surface shown in FIG. 2.

The shape of a cell engraved by the diamond needle 32a is shown in FIGS. 3a and 3b. FIG. 3a is a cross sectional view perpendicular to the plate of an engraved cell and FIG. 3b is a view when viewed from the upper direction of the plate. When viewed from the upper direction, as shown in FIG. 3b, the engraved cell is of rhomboid having diagonal lines of x and y in length. In this instance, the direction of the length x corresponds to the direction of the rotary shaft of the engraving cylinder 31, and the direction of the length y corresponds to the circumferential direction of the engraving cylinder 31. The size of this cell is determined by the central position of vibration by the amplitude angle O of the stylus 32. A cell formed in the case where the stylus 32 vibrates about a center position indicated by a broken line in FIG. 4b is larger than a cell formed in the case where the stylus 32 vibrates about a center position indicated by a broken line in FIG. 4a. Accordingly, in the case of engraving a cell corresponding to a pixel having a large density value, an approach is employed to allow the vibration center position of the diamond needle 32a to be close to the plane, thus to engrave a large cell, and in the case of engraving a cell corresponding to a pixel having a small density value, an approach is employed to allow the vibration center position of the diamond needle 32a to be away from the plane, thus to engrave a small cell. Thus, cells corresponding to the density distribution of the manuscript can be formed. The vibration of the stylus 32 is controlled by the drive device 33. The drive device 33 is, in practice, composed of a solenoid, and is driven by a current corresponding to a cell width value given from the engraving control unit 20.

Operation of the Engraving Control Unit

The operation of the engraving control unit 20 which features the invention of this application will now be described. In the apparatus of this embodiment, the density value given from the reading head 12 takes the range of 0 to 100%. The engraving control unit 20 converts a density value given in this range to a cell width value to deliver a current corresponding to that cell width value to the drive device 33. The drive device 33 vibrates the stylus 32 at the center position in correspondence with the given current. Eventually, a cell of a size designated by the cell width value is engraved on the plate. The feature of the first invention of this application resides in that density values given from the reading head 12 are distributed into the photo tone processing section 23 or the character/solid tone processing section 24 by the signal distribution unit 21 to convert density values to cell width values using individual functions, respectively. Namely, density values of pixels constituting a pattern of a photo tone (picture having a gentle tone like a photograph) are converted to cell width values using a function for a photo tone at the photo tone processing section 23. Further, density values of pixels constituting a pattern of a character/solid tone (portion where characters are arranged, or a picture of a colored portion having no tone) are converted to cell width values using a function for a character/solid tone processing section 24. Distribution of signals is controlled by an instruction from the picture area designation unit 22. This picture area designation section 22 is comprised of hardware including, in combination, a CRT unit for displaying a picture taken in from the picture input unit 10, a coordinate input unit for inputting coordinates on a visual display screen of the CRT unit, and the like, thus to designate a picture area on the basis of an instruction from an operator. For example, in a manuscript as shown in FIG. 2, it is assumed that photo pictures are laid out in areas A1 and A2 indicated by hatching in the figure, and a patter of a character or a solid tone is laid out in the remaining area A0. In this case, operator gives, to the picture area designation section 22, an instruction such that the areas A1 and A2 are picture areas of a photo tone and the area A0 is the picture area of a character/solid tone. Such an instruction may be made by inputting four corners of respective areas by a coordinate input device. In this way, the picture area designation section 22 delivers information for designating a picture area to the signal distribution section 21 on the basis of data inputted from the operator. The signal distribution section 21 determines to which section a given density value is distributed. For example, in FIG. 2, where density values with respect to pixels on the scanning line S are given in sequence on a time series basis, the signal distribution section carries out the following operation: when a density value with respect to pixels of the section a is given, the signal distribution section 21 distributes this density value to the character/solid tone processing section 24, when a density value with respect to pixels of the section b is given, the signal distribution section 21 distributes this density value to the photo tone processing section 23, and when a density value with respect to pixels of the section c is given, the signal distribution section 21 distributes this density value to the character/solid tone processing section 24. Eventually, density values with respect to pixels within areas A1 and A2 of FIG. 2 are distributed to the photo tone processing section 23, and density values with respect to pixels within the area A0 are distributed to the character/solid tone processing section 24.

In the photo tone processing section 23 and the character/solid tone processing section 24, given density values are converted to corresponding cell width values, respectively. These conversions are carried out by using functions different from each other. In the graph shown in FIG. 5, the ordinate represents an inputted density value (%), and the abscissa represents an outputted cell width value (μm). In this figure, the function A indicated by a single-dotted-line represents a function used at the photo tone processing section 23, and the function B indicated by the solid line represents a function used at the character/solid tone processing section 24. As is clear from the graph, in the case of the function A, there is carried out a conversion such that according as the density value increases in a range from 0 to 100%, the cell width value increases in succession in a range from 0 to 150 μm. In the conventional apparatus, a substantially linear conversion function as indicated by the function A was commonly used over the entire area of a picture. Namely, the same function A is applied to both the picture area of a photo tone and the picture area of a character/solid tone. The key teaching of the first invention of this application resides in that an approach is employed to divide a manuscript picture into a plurality of picture areas to apply different conversion functions every respective picture areas. Namely, in this embodiment, the same function A as that in the prior art is applied to the picture area of a photo tone, but a new unique function B is applied to the picture area of a character/solid tone. The key teachings of the fourth and fifth inventions of this application resides in the feature itself of the new function B. The feature of the function B is as follows.

(1) In the area where the density value is lower than a predetermined value C1, the cell width value is always zero.

(2) In the area where the density value is higher than a predetermined value C2, the cell width value is always the maximum value W2 (150 μm in this example).

(3) In the intermediate area having a density value between C1 and C2, the cell width value increases from the minimum value W1 to the maximum value W2 with an increase in the density value while varying stepwise.

Figure 5:
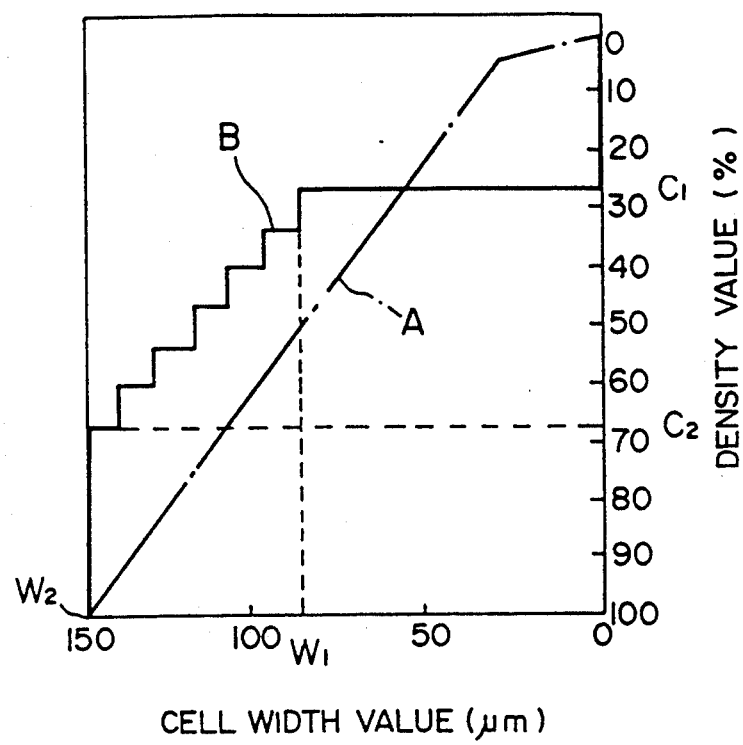
FIG. 5 is a graph showing a function used for converting density values to cell width values in the apparatus shown in FIG. 1.
Figures 6A, 6B:
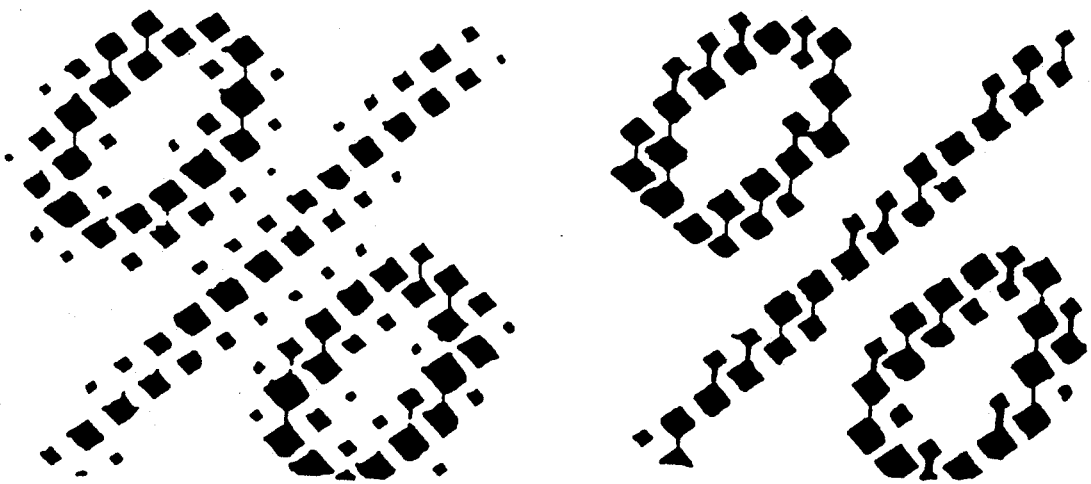
FIG. 6a is a view showing a printing type engraved using the function A of FIG. 5.
FIG. 6b is a view showing a printing type engraved using the function B of FIG. 5.

Here, where a setting is made such that C1 is in a range of approximately 10 to 60%, C2 is in a range of approximately 40 to 90%, C1 < C2 holds, and a setting is made such that W1 is in a range of approximately 30 to 150 μm, W2 is in a range from the maximum cell width, considering a pitch between cells used, to about W1 + 10 μm, a satisfactory character reproduction can be conducted. Particularly, a satisfactory plate preparation result as shown in FIG. 6b which will be described later is provided when settings are made such that C1 value is equal to 40±10%, that C2 value is equal to 60±10%, W1 value is equal to 110±30 μm, and that W2 value is equal to 150 μm, respectively. It is to be noted that while the curve in FIG. 5 is used in the case of engraving at a pitch of 125 μm, between cells, where the pitches are 100 μm and 185 μm, respectively, curves corresponding thereto may be used.

As stated above, the functions A and B have features different from each other, and the engraved result varies in dependency upon whether either of these functions is used. In FIGS. 6a and 6b, there is shown a comparison between the plate preparation result using the function A and the plate preparation result using the function B. In both figures, a character of "%" is used as a manuscript. FIG. 6a shows a printing type of a plate prepared by using the function A, and FIG. 6b shows a printing type of a plate prepared by using the function B. When observation is conducted with a spacing a little from the plane of paper, it is seen that the printing character of FIG. 6b is more distinct than the printing character of FIG. 6a. This is because the function has three features as described above. It is considered that these three features provide the following advantages, respectively.

(1) With respect to pixels having a density value up to C1, any cell is engraved at all. When the density value becomes equal to C1, cells of the cell width W1 are engraved. Eventually, there is no possibility that a cell having a cell width smaller than W1 is engraved with respect to pixels having a density value lower than C1. Accordingly, only cells having a size larger than the cell width W1 exist on the plane. Thus, distinction of the contour portion of the printing type can be improved. In the case of the printing type of FIG. 6a, since small cells are formed at the contour portion of the printing type, the contour is blurred, resulting in a gentle tone. On the contrary, in the case of the printing type of FIG. 6b, since such cells are not formed, a distinct contour is provided.

(2) With respect to pixels having a density value higher than C2, cells of the maximum width W2 are engraved. Accordingly, the cell area and the cell internal capacity are increased as a whole, so a quantity of ink at the time of printing is increased. Thus, printing having a high density can be conducted. The printing type of FIG. 6b has a density higher than that of the printing type of FIG. 6a.

(3) With respect to pixels having a density value between C1 and C2, the cell width varies stepwise. Accordingly, the size of cells constituting a printing type is limited to several kinds of sizes. Thus, distinction of the printing type is improved. The printing type of FIG. 6a is such that cells having various sizes are mixed with each other. On the contrary, the printing type of FIG. 6b is composed of only cells of several kinds of sizes. As a result, distinction as the entirety of the printing type is improved.

Eventually, it is seen that the function A is suitable for a picture of a photo tone giving a gentle tone, and the function B is suitable for a picture for which distinction is required. In the apparatus shown in FIG. 1, since density values of pixels within picture areas A1 and A2 of a photo tone are distributed to the photo tone processing section 23 by the signal distribution section 21, the function A suitable for photo tone is applied. On the other hand, since density values of pixels within the picture area A0 of character/solid tone are distributed to the character/solid tone processing section 24, the function B suitable for character/solid tone is applied. Accordingly, a plane prepared at the engraving unit 30 is such that pictures of photo tone are suited to photographs of a gentle tone, and pictures of character/solid tone are distinct and is easy to read. In this way, a plane of a satisfactory picture as a whole can be prepared.

Examples of Application to Various Systems

Figure 7:
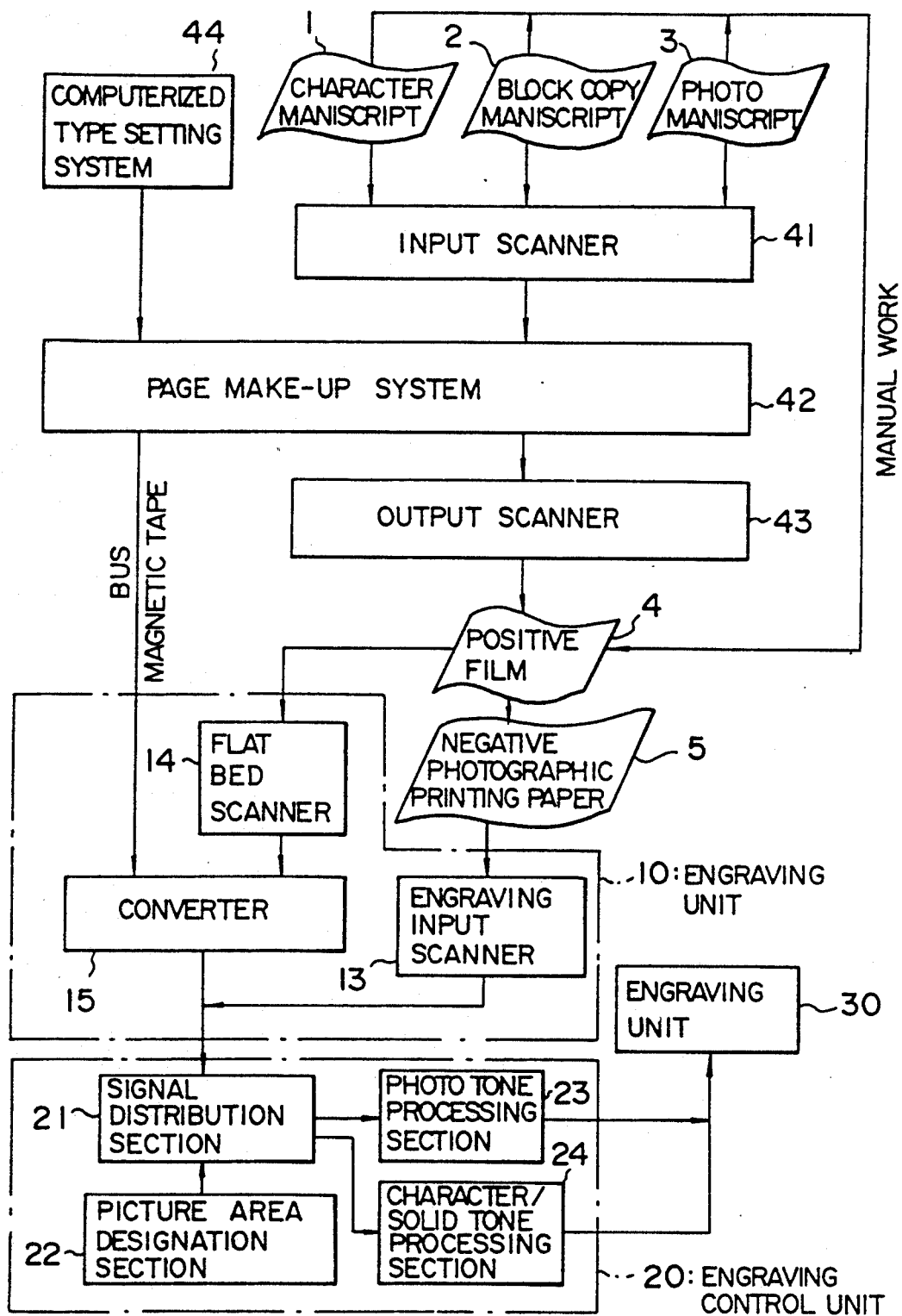
FIG. 7 is a block diagram showing the entirety of a plate making system including an electronic gravure apparatus of this invention.

While this invention has been described in connection with the basic embodiment, this invention may be implemented in various forms in addition to the above-mentioned embodiment. FIG. 7 is a block diagram showing the entire configuration of a plate making system including an electronic gravure engraving apparatus according to this invention. The entire configuration of this system will be first described, and another embodiment of this invention will be then described.

An operator first prepares a character manuscript 1, a block copy manuscript 2, and a photo maniscript 3 to take pictures on these respective manuscripts into a page make-up system 42 by an input scanner 41. Namely, pictures on respective manuscripts are taken in as pictorial image data comprised of a set of density values of a plurality of pixels. It is to be noted that a picture of a character may be inputted as pictorial image data from a computerized typesetting system 44 in place of taking in the character manuscript 1 by the input scanner 41. At the page make-up system, these respective pictorial image data are synthesized. Thus, a manuscript picture originally defining the feature of printing is formed. This manuscript picture is outputted in the form of a positive film 4 by an output scanner 43. It is to be noted that the positive film 4 may be directly prepared by manual work from the character manuscript 1, the block copy manyscript 2, and the photo manuscript 3 without using the page make-up system 42.

Subsequently, a manuscript picture provided in the form of the positive film 4 is inputted by the picture input unit 10. One method is a method to prepare a negative photographic printing paper 5 (bromide paper) from the positive film 4 to scan the photographic printing paper 5 using the engraving input scanner 13, thus taking the manuscript picture into the picture input unit 10 as pictorial image data and delivering it to the engraving control unit 20. The apparatus of the basic embodiment of this invention shown in FIG. 1 is directed to an apparatus for carrying out the above-mentioned method. Here, the picture input unit 10 of FIG. 1 corresponds to the engraving input scanner 13 of FIG. 7. The processing after inputted picture data is taken into the engraving control unit 20 is the same as that previously described. Namely, the manuscript picture is divided into an area of a photo tone and an area of a character/solid tone by the picture area designation section 22, and pictorial image data is distributed to the photo tone processing section 23 or the character/solid tone processing section 24 through the signal distribution section 21. In these processing sections, processing for respectively converting density values of pictorial image data to cell width values by different functions are carried out, an engraving is carried out on the basis of the converted cell width value at the engraving unit 30. The above-described embodiment corresponds to the second feature of this application.

As a further embodiment, a method corresponding to the third feature of this application, in which a manuscript picture on the positive film 4 is directly inputted as pictorial image using a flat bed scanner 14, will now be described. This method is exactly the same in principle as the previously described method in which pictorial image data is inputted from the photographic printing paper 5 using the engraving input scanner 13. However, there is a large difference between resolution of pictorial image data taken in by the engraving input scanner 13 and that by the flat bed scanner 14. The engraving input scanner 13 has a function to take in pictorial image data with a resolution adapted for engraving at the engraving unit 30. Accordingly, pictorial image data taken in by the engraving input scanner 13 has a resolution considerably lower than that of pictorial image data taken in by the flat bed scanner 14. To speak conversely, this implies that pictorial image data taken in by the flat bed scanner 14 has a resolution too high to operate the engraving unit 30. In view of this, in the apparatus of this embodiment, a converter 15 is provided to carry out conversion of pictorial image data so that the resolution of pictorial image data taken in by the flat bed scanner 14 is in conformity with the resolution of the engraving unit 30. This may be accomplished, e.g., by carrying out a processing to replace a plurality of pixels constituting pictorial image data of a high resolution taken in by the flat bed scanner 14 by one large pixel having, as a density value, an average value of density values of the plurality of pixels to generate pictorial image data of a low resolution.

As a further different embodiment of this invention, there is a method to directly deliver pictorial image data of a manuscript picture generated by the page make-up system 42 to the converter 15. This method may be implemented by delivering pictorial image data outputted from the page make-up system 42 to the converter 15 through the bus as it is by on-line system, or by delivering the same from the page make-up system 42 to the converter 15 by making use of a magnetic tape as a medium. In accordance with this method, since it is completely unnecessary to prepare the positive film 4, the processing time can be reduced. It is to be noted that since the pictorial image data prepared by the page make-up system 42 has a resolution as high as that of the pictorial image data taken in by the flat bed scanner 14, conversion of resolution is carried out by the converter 15.

Figure 8:
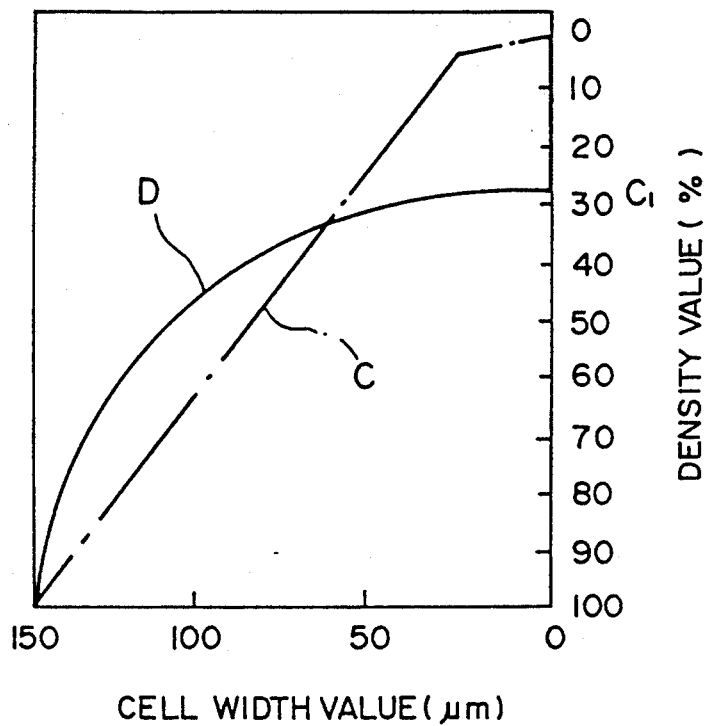
FIG. 8 is a graph showing a function for converting density values to cell width values, which is used in the system shown in FIG. 7.

It is to be noted that, in connection with pictorial image data taken in originally at a low resolution image data taken in originally at a low resolution by the engraving input scanner 13 and pictorial image data provided by implementing a conversion for lowering resolution by the converter 15, it is preferable to convert density values to cell width values using different functions at the photo tone processing section 23 and the character/solid tone processing section 24, respectively. With respect to pictorial image data taken in by the engraving input scanner 13, as described in the previously described embodiment, it is preferable to use the function A at the photo tone processing section 23 and to use the function B at the character/solid tone processing section 24 in the graph shown in FIG. 5. On the contrary, with respect to pictorial image data provided by implementing a conversion for lowering a resolution by the converter 15, as in the graph shown in FIG. 8, it is preferable to use the function C indicated by a single dotted line at the photo tone processing section 23 and to use the function D indicated by a solid line at the character/solid tone processing section 24. In this instance, the function C for photo tone is exactly the same function as the function A of FIG. 5, but the function D for character/solid tone is slightly different form the function B of FIG. 5. This function D is a function which should be the key teaching of the sixth feature of this application, and the main points of the feature are as follows.

(1) In the range where the density value is lower than a predetermined value C1, the cell width value is always zero. This is a feature common to that of the function B. As previously described, a printing type which is blurred and has a gentle tone as shown in FIG. 6a can be changed to a distinct printing type as shown in FIG. 6b.

(2) Only when the density value is 100%, the cell width value becomes the maximum value. When an experiment is actually conducted, the most excellent result is provided by such a setting.

(3) In the range where the density value is C1 to 100%, the cell width value increases in a manner of logarithmic function with respect to changes in the density value. Since typical scanners have a considerably high resolution, there is a tendency that the positive line width on the cylinder becomes narrow. This gives the cause of a blur in printing a book. By an employment of such a curve of a logarithmic function, respective cells are enlarge. Thus, blur in printing a book can be prevented.

Figure 9:
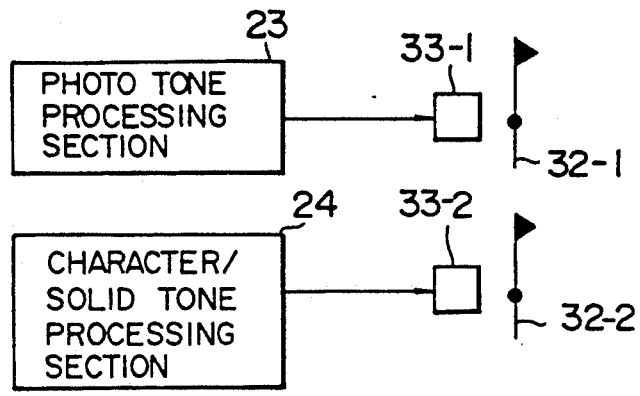
FIGS. 9 and 10 are block diagrams of an electronic gravure engraving apparatus according to different embodiments of this invention, respectively.

In the basic embodiment shown in FIG. 1, there is employed an arrangement such that only one set of the stylus 32 and the drive device 33 are provided at the engraving unit 30 to deliver a cell width value outputted from the photo tone processing section 23 and the character/solid tone processing section 24 to the same drive device 33. In addition, as shown in FIG. 9, there may be employed an arrangement such that two sets of styli 32 and drive devices 33 are provided. The first stylus 32-1 is driven by a cell width value outputted from the photo tone processing section 23 and the second stylus 32-2 is driven by a cell width value outputted from the character/solid tone processing section 24, thus permitting drive controls to be completely independent. In this case, it is possible to conduct a proper use of styli and drive devices of different natures such that the stylus 32-1 and the drive device 33-1 are caused to be suited to engraving of a photo tone and the stylus 32-2 and the drive device 33-2 are caused to be suited to engraving of character/solid tone. For example, it is preferable for engraving of a character tone to use a drive device having a small scanning pitch and a stylus acute in an angle of the front end portion to improve a resolution.

Figure 10:
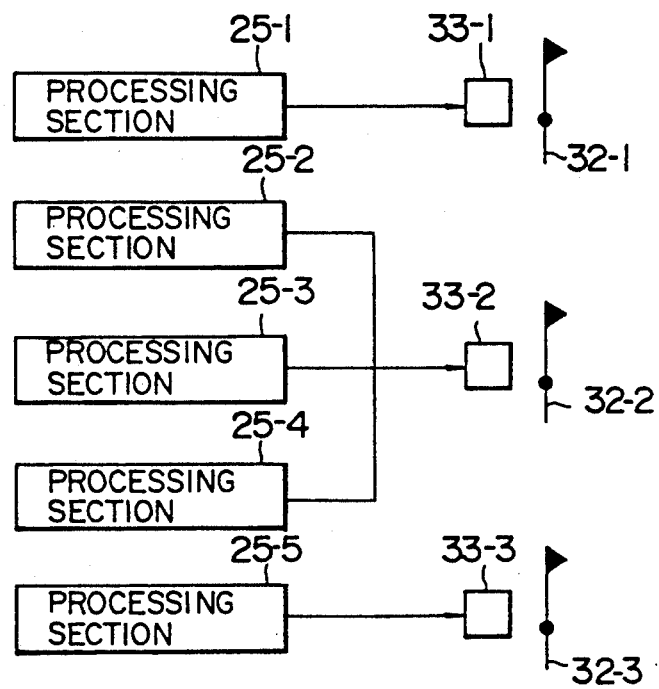

Further, while in the above-described embodiment, a handling is made such that a picture is divided into those of photo tone and character/solid tone, it is of course possible to make a handling such that a picture is divided into three picture elements or more. FIG. 10 is an embodiment wherein five processing sections 25-1 to 25-5 are provided to use different functions at respective sections. For example, a picture of a character tone is handled at the processing section 25-1, pictures of a photo tone are handled at the processing sections 25-2 to 25-4, and a picture of a solid tone is handled at the processing section 25-5. Separate styli 32-1, 32-2, and 32-3 are used, respectively. In addition, even in the case of photo tone, a picture is divided into a photograph of a gentle tone, a photograph of an ordinary tone, and a photograph of a hard tone to conduct a processing using different functions at respective separate processing sections of the processing sections 25-2, 25-3, and 25-4.

In the invention of this application, also with respect to the method of designating a picture area, various embodiments are conceivable. In all of the previously described embodiments, an operator designates a picture area of a photo tone and a picture area of a character/solid tone by the picture area designation section 22 provided in the engraving control unit 20. Such a designation can be made before a manuscript picture is given to the engraving control unit 20. For example, if a method of taking a manuscript picture from the printing paper 5 into the engraving input scanner 13 is used, it is sufficient to prepare separate printing papers 5 every respective picture areas. For example, it is sufficient to separately prepare a first printing paper including only a picture with respect to the picture area of photo tone, and a second printing paper including only a picture with respect to the picture area of character/solid tone of the manuscript picture to separately take these printing papers by the engraving input scanner 13. When there is conducted processing to deliver pictorial image data with respect to the first printing paper to the photo tone processing section 23, and to deliver pictorial image data with respect to the second printing paper to the character/solid tone processing section 24, the picture area designation section 22 becomes unnecessary. Further, if a method of taking a manuscript picture from the positive film 4 into the flat bed scanner 14 is used, it is sufficient to prepare separate positive films 4 every respective picture areas to separately take them thereinto. Furthermore, if there is used a method of taking a manuscript picture from the page make-up system 42 directly into the converter 15 through the bus or a magnetic tape, it is possible to carry out designation of a picture area at the page make-up system 42. Since the page make-up system 42 is provided with a display for visual display of a picture, an operator can carry out with ease designation of a picture area on this display.

INDUSTRIAL APPLICABILITY

An electronic gravure engraving apparatus according to the invention of this application can be widely utilized for a plate making system for gravure printing based on the electronic engraving process system. Particularly, this electronic gravure engraving apparatus can be applied to all of the system for taking a manuscript picture from the printing paper thereinto using an engraving input scanner, the system taking a manuscript picture from the positive film thereinto using a flat bed scanner, and the system for taking a manuscript picture thereinto as pictorial image data given from the page make-up system, and is therefore widely utilizable in industry.

We claim:

1. An apparatus for making a press plate for gravure printing by an electronic engraving process comprising:
   a picture input unit for inputting a manuscript picture as a set of pixels having a density value,
   an engraving unit including a stylus for engraving cells corresponding to said respective pixels on a plate, a drive device for vibrating said stylus, and a scanning mechanism for scanning said stylus onto said plate,
   picture area designation means for designating a photo tone area having a gentle tone and a character/solid tone area where characters or solid patterns without tone are arranged on said manuscript picture,
   photo tone processing means for converting a density value of a pixel in said photo tone area into a cell width value indicating a size of a cell to be engraved and delivering said cell width value to said engraving unit to thereby engrave a cell of the indicated size, character/solid tone processing means for converting a density value of a pixel in said character/solid tone area into a cell width value indicating a size of a cell to be engraved and delivering said cell width value to said engraving unit to thereby engrave a cell of the indicated size, and signal distribution means for distributing density values in said photo tone area of the inputted pixels to said photo tone processing means and density values in said character/solid tone area of the inputted pixels to said character/solid tone processing means, wherein said photo tone processing means delivers a cell width value that increases linearly with an increase in a distributed density value in a substantial range of density values, and wherein said character/solid tone processing means delivers a cell width value indicating that a cell is not to be engraved when a distributed density value is lower than a first density value (indicative of a minimum density value for a cell engraving), a maximum cell width value indicating that a cell of the maximum size is to be engraved when a distributed density value is higher than a second density value (indicative of a minimum density value for the engraving of maximum sized cells), and a cell width value increasing from said minimum cell width value to said maximum cell width value with an increase in the density value when a distributed density value is between said first and second density values.

2. An apparatus as claimed in claim 1, wherein the character/solid tone processing means delivers a cell width value that increase stepwise from the minimum cell width value to the maximum cell width value with an increase in the density value when a distributed density value is between the first and second density values.

3. An apparatus for making a press plate for gravure printing by an electronic engraving process comprising:

a picture input unit for inputting a manuscript picture as a set of pixels having a density value, an engraving unit including a stylus for engraving cells corresponding to said respective pixels on a plate, a drive device for vibrating said stylus, and a scanning mechanism for scanning said stylus onto said plate, picture area designation means for designating a photo tone area having a gentle tone and a character/solid tone area where characters or solid patterns without tone are arranged on said manuscript picture, photo tone processing means for converting a density value of a pixel in said photo tone area into a cell width value indicating a size of a cell to be engraved and delivering said cell width value to said engraving unit to thereby engrave a cell of the indicated size, character/solid tone processing means for converting a density value of a pixel in said character/solid tone area into a cell width value indicating a size of a cell to be engraved and delivering said cell width value to said engraving unit to thereby engrave a cell of the indicated size, and signal distribution means for distributing density values in said photo tone area of the inputted pixels to said photo tone processing means and density values in said character/solid tone area of the inputted pixels to said character/solid tone processing means, wherein said photo tone processing means delivers a cell width value that increases linearly with aa increase in a distributed density value in a substantial range of density values, and wherein said character/solid tone processing means delivers a cell width value indicating that a cell is not to be engraved when a distributed density value is lower than a predetermined density value (indicated of a minimum density value necessary to engrave a cell), and a cell width value increasing in as a logarithmic function with respect to an increase in the density value when a distributed density value is higher than said predetermined density value.

* * * * *